Figure 1:
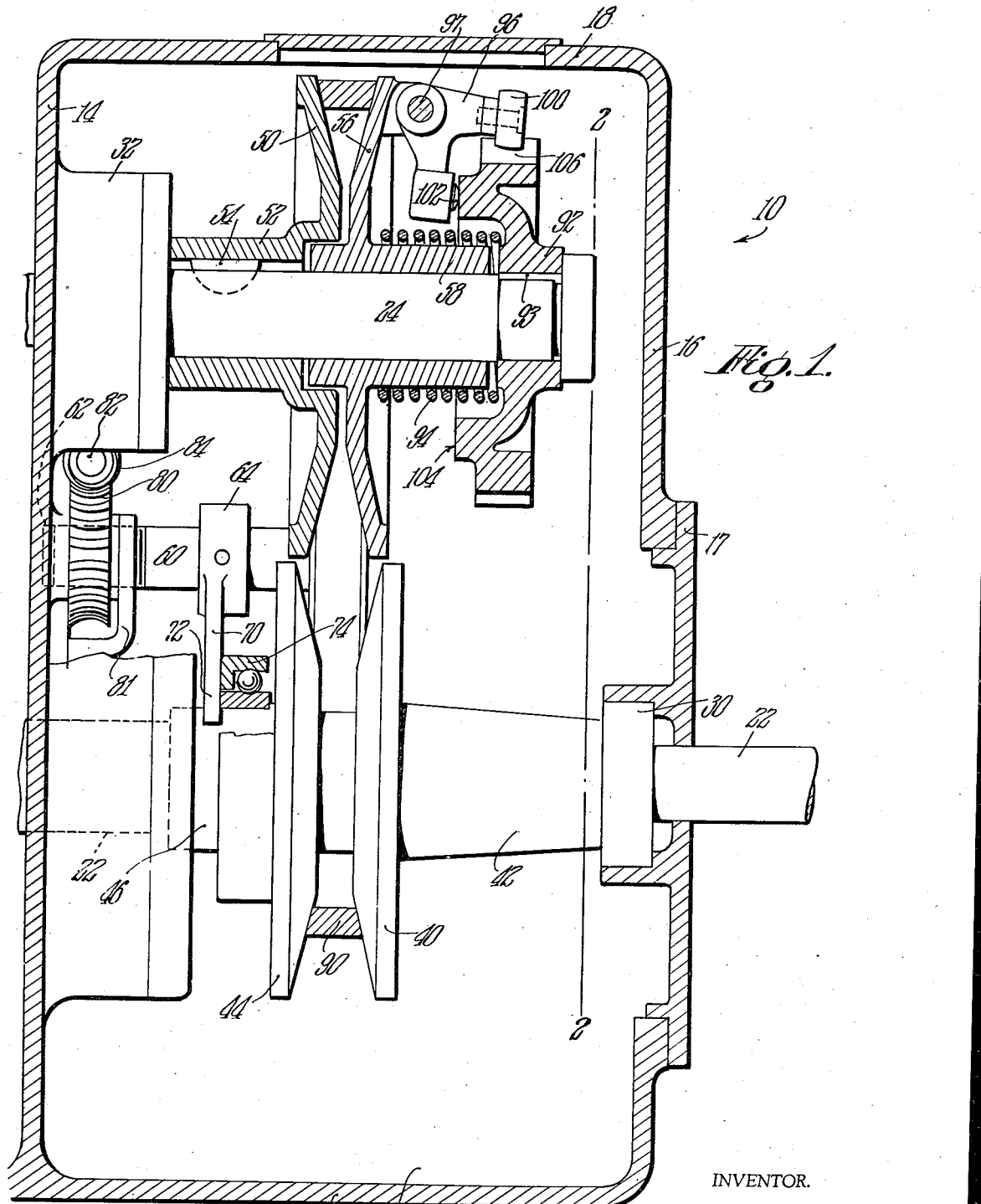

Aug. 26, 1941.  R. E. GETCHELL  2,254,177
PULLEY CONSTRUCTION
Filed July 1, 1940  2 Sheets—Sheet 1

INVENTOR.
BY Raymond E. Getchell
Walter C. Ross. Attorney.

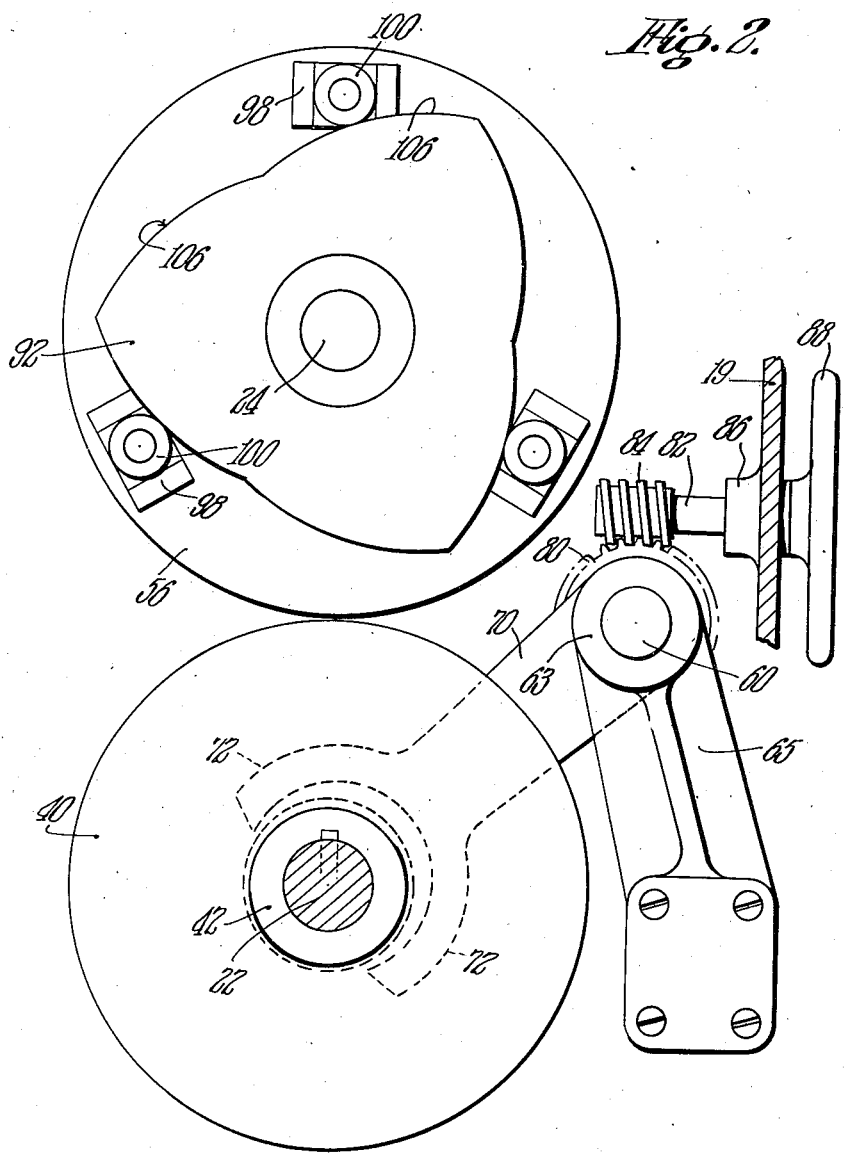

Patented Aug. 26, 1941

2,254,177

UNITED STATES PATENT OFFICE 2,254,177

PULLEY CONSTRUCTION

Raymond E. Getchell, Holyoke, Mass., assignor to B. F. Perkins & Son, Inc., Holyoke, Mass., a corporation of Massachusetts Application July 1, 1940, Serial No. 343,389

3 Claims. (Cl. 74—230.17)

My invention relates to a driving mechanism adapted for general use as well as in variable speed transmitting devices and this application is a continuation in part of an application filed by me on July 26, 1939 and serially numbered 286,509.

The principal object of the invention is to provide a driving mechanism that is extremely simple, efficient, and of a practical nature for varying the relative speeds of driving and driven members such as in the construction shown in the application referred to.

The invention is particularly well suited for use in connection with a speed change mechanism wherein it is desired to vary the relative speeds of driving and driven members. Although the invention is described as being particularly well suited for use in connection with driving mechanisms, it will be readily apparent that this use is only one of a great number of uses for which the device is adapted.

One important object of the invention is the provision of an improved construction of a grooved pulley wherein the effective belt groove diameter thereof is variable according to the diameter of a pulley operatively related thereto. That is, where the relatively adjustable members of a V pulley are moved apart or towards one another to vary the effective diameter thereof the V belt causes an operatively related V pulley to become adjusted in accordance therewith, all to the end that one only of a pair of V pulleys need be adjusted to vary the relative effective diameters of the pulleys.

In the device of my invention, the belt is so utilized as to adjust the pulley parts to an extent necessary to overcome slippage, etc. By means of my device, maximum efficiency in operation is achieved and, furthermore, its application renders possible and practicable the use of a standard and inexpensive V-belt construction as contrasted with the requirements for specially designed belt constructions called for by certain prior art devices.

It is another object of my invention to provide a new and efficient means for varying the speed of a driving unit and a driven unit and to provide a new and novel combination of an expanding sheave and V-belt transmission.

It is a still further object to provide new and novel variable speed transmission means, in combination with a belt, which is adaptable to vary the revolutions per minute of the driven unit and which is capable of a greater speed than has ever heretofore been possible on variable transmission appaartus types and which is of lighter construction than has heretofore been deemed feasible.

Other objects of my invention are the provision of a means which is adapted to lengthen the normal life of the belt, used thereon, to decrease the amount of belt stretching, to reduce the upkeep costs, and to provide the various other advantages and results which will be made more evident from the specification below.

It is one important object of my invention to provide a pulley construction whereby an automatic adjustment of the pulley is obtained so as to compensate for the variations of length and tension of the belt, load variations, etc. As a special feature, the pulley of my invention has co-operating tapered faces, one of which faces is movable with respect to the other, in combination with a means for varying the relative positions of the surfaces automatically in accordance with the tension of or load on the belt between said surfaces.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a longitudinal sectional elevational view through a mechanism embodying the novel features of my invention; and Fig. 2 is a sectional view along the line 2—2 of Fig. 1 to explain certain details of construction.

Referring now to the drawings more in detail, wherein similar reference figures refer to like parts, and referring more particularly to the preferred form of my invention which has been selected for illustrative purposes, I have shown part of a casing or housing 10 in which are disposed for rotation an input shaft and an intermediate or control shaft which are connected by the mechanism of the invention as will be explained. The casing has a lower wall 12, a rear wall 14, a front wall 16, a top wall 18, and side walls 19.

The input or drive shaft is designated by the character 22 and the intermediate or control shaft is indicated as 24. The input shaft, on its outer end, is journalled in a bearing 30 carried by a plate member 17, which is secured to the housing in any desired manner. The shaft member 24 is likewise mounted for rotation by means of a bearing 32 associated with the wall 14.

A half-cone pulley part 40 has a hub 42 fixed to the shaft 22 and another half-cone pulley part 44 has a hub part 46 which is reciprocable on the shaft 22, substantially as shown.

A cone pulley part 50 has a hub 52 as shown and one or more keys 54 are associated with the shaft 24 and the cone pulley part 50 so as to fix the latter to the former. Another cone pulley part 56 having a hub 58 is reciprocable on the shaft 24 substantially as shown.

It will be understood by those conversant with the art to which this invention pertains that when assembled as above, the two movable cone pulley parts 44 and 56 are movable towards and away from the two fixed cone pulley parts 40 and 50 respectively along their respective shafts 22 and 24 whereby the effective diameters of the pulley constructions is varied. In Fig. 1, the cone pulley parts are shown distanced from each other although it is to be appreciated that by the means about to be described, the various component parts may be brought together for various effects which are likewise to be explained more fully.

The parts 44 and 56 of the cone pulleys are movable back and forth along their respective shafts so as to vary the effective diameters of the cone pulleys aforesaid. According to the invention as disclosed, the cone pulley part 44 is moved to provide a certain effective diameter while the part 56 is moved more or less automatically as will appear.

The part 44 is moved to the right to increase the effective diameter of the pulley and to the left to decrease the diameter. Said part 44 may be moved to the right by various means but the means now to be described will suffice.

An operating shaft 60 is reciprocable at one of its ends in a bore 62 in the wall 14 of the casing and it is reciprocable at its other end in a bearing 63 of a bracket 65. This shaft 60 carries the hub 64 of a fork 70 which has downwardly depending forked end parts 72, as is shown in Fig. 2, which surround the hub 46 of the cone pulley part 44 and act on a thrust bearing 74 associated with hub 46.

As the shaft 60 is moved in one direction or the other the fork 70 is likewise moved back and forth so that member 44 is adjusted relative to member 40. The inner end of the shaft 60 is threaded and an internally threaded worm wheel 80 is in threaded engagement therewith. The worm wheel 80 is held against axial displacement by bracket 81.

A transverse shaft 82 having a worm 84 at one end thereof in mesh with wheel 80, is rotatable in a bearing member 86 of the casing and a hand wheel 88 on said shaft 82 may facilitate rotation thereof. As shaft 82 is rotated in one direction or the other, the shaft 60 is moved axially to move member 70.

A V belt 90 of the endless type passes around the V pulleys as shown in Fig. 1. A cam 92 is fixed to shaft 24 as by a key 93 and a spring 94 between said cam and member 56 urges the member 56 to the left.

A plurality of levers 96 pivoted at 97 to lugs 98 of pulley part 56 have rolls 100 on their outer ends and carry on their lower ends studs 102 which bear on a surface 104 of the cam 92. The cam 92 has curved peripheral cam surfaces 106 arranged to provide relatively low and high points and outwardly curving faces.

The shaft 22 may be the drive shaft so that as it rotates the pulley of shaft 24 is rotated by means of the belt 90 and pulley on said shaft 22. Should the load increase or should any other condition cause the member 56 to be rotated by the belt relative to member 50, said member 56 is moved towards the member 50 until the belt is frictionally engaged to overcome the relative rotating tendency. This is brought about by levers 96.

The levers 96 carried by member 56, which have their rolls on the cam surfaces, are rotated relative to the cam so that the said levers through the rolls and cam surfaces are swung on their axes. Swinging of the levers since their lower ends bear on cam part 104 acts to move the member 56 towards member 50 until the tendency of member 56 to rotate relative to member 50 ceases. Thus the member 56 accommodates itself to the conditions of torque, load and general condition or action of belt.

The relative diameter is changed by moving member 44 to the right towards member 40 or allowing said member 44 to move in an opposite direction since the member 56 may move to the right against the spring 94. At all times the levers and cam are adapted to accommodate the conditions of torque, load or condition of the belt both in varying diameter of the lower pulley as well as in accommodating variations of load, torque, slippage, etc.

The diameter of the lower pulley may be adjusted so as to be maintained at some desired predetermined diameter while the diameter of the upper pulley is adjusted automatically relative thereto. The diameter of the upper pulley is maintained by action of the levers and cam which is brought into play accordingly as there is a tendency of the belt to slip in the upper pulley or the load on the belt varies the upper pulley parts are adjusted to accommodate the load conditions.

Manifestly the specific details of construction may be considerably varied from those herein shown and described without involving any departure from the principle of the invention or sacrificing any of the advantages inherent therein. While I have described my invention in this specification in great detail and particularly with respect to the present preferred form thereof, it is not desired to be limited thereto since many changes and modifications may be made therein without departing from the spirit and scope of the invention.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination with a pair of spaced parallel rotatable shafts of means for driving one shaft from the other comprising, a V pulley on one shaft including a part fixed thereto and an adjacent part movable relative thereto axially on said shaft, a V pulley on the other shaft having a part fixed thereto and an adjacent part movable relative thereto axially and rotatably on said shaft, an endless belt engaging the said pulleys, a cam member having on said other shaft a plurality of cam surfaces and an annular surface disposed transversely to the axis of said shaft, and a plurality of levers pivoted on the movable pulley part on said other shaft each having portions engaging said cam surfaces and said annular surface, all adapted and arranged whereby as the last-named movable pulley part rotates in one direction relative to the fixed pulley part adjacent thereto it is moved towards said fixed pulley part by the action of the levers and cam and annular surfaces engaged thereby.

2. The combination with a pair of spaced parallel rotatable shafts of means for driving one shaft from the other comprising, a V pulley on one shaft including a part fixed thereto and an adjacent part movable relative thereto axially on said shaft, a V pulley on the other shaft having a part fixed thereto and an adjacent part movable relative thereto axially and rotatably on said shaft, an endless belt engaging the said pulleys, a cam member on said other shaft having a cam surface and a lever surface disposed transversely to the axis of said shaft, and a lever pivoted to the movable pulley part on said other shaft having a portion engaging said cam surface and said lever surface of the cam member, all adapted and arranged whereby as the last-named movable pulley part rotates in one direction relative to the fixed pulley part adjacent thereto it is moved towards said fixed pulley part by the action of the lever and cam and lever surfaces engaged thereby.

3. The combination with a pair of spaced parallel rotatable shafts of means for driving one shaft from the other comprising, a V pulley on one shaft including a part fixed thereto and an adjacent part movable relative thereto axially on said shaft, a V pulley on the other shaft having a part fixed thereto and an adjacent part movable relative thereto axially and rotatably on said shaft, an endless belt engaging the said pulleys, a cam member on said other shaft having a cam surface and a lever surface disposed transversely to the axis of said shaft, and a lever pivoted to the movable pulley part on said other shaft on an axis parallel to that of said other shaft having a portion engaging said cam surface and said lever surface of the cam member, all adapted and arranged whereby as the last-named movable pulley part rotates in one direction relative to the fixed pulley part adjacent thereto it is moved towards said fixed pulley part by the action of the lever and cam and lever surfaces engaged thereby.

RAYMOND E. GETCHELL.